United States Patent [19]

Carlson, Jr. et al.

[11] 4,056,749
[45] Nov. 1, 1977

[54] MODULAR MOTOR

[75] Inventors: Christian R. Carlson, Jr.; Michael J. Hillyer, both of Mechanicsburg, Pa.

[73] Assignee: General Signal Corporation, Rochester, N.Y.

[21] Appl. No.: 650,383

[22] Filed: Jan. 19, 1976

[51] Int. Cl.$^2$ .......................................... H02K 13/00
[52] U.S. Cl. ...................................... 310/239; 310/71
[58] Field of Search ............................ 310/239–242, 310/245, 246, 247, 194, 42, 91, 89, 71, 40 MM

[56] References Cited

U.S. PATENT DOCUMENTS

| | | | |
|---|---|---|---|
| 2,123,933 | 7/1938 | Cotterman | 310/71 |
| 3,226,585 | 12/1965 | Roe | 310/194 |
| 3,521,096 | 7/1970 | Merriam | 310/89 |
| 3,603,824 | 9/1971 | Csaki | 310/71 |
| 3,617,786 | 11/1971 | Stielper | 310/89 |
| 3,699,366 | 10/1972 | Wood | 310/91 |
| 3,784,856 | 1/1974 | Preston | 310/239 |
| 3,955,113 | 5/1976 | Hillyer | 310/245 |

*Primary Examiner*—R. Skudy
*Attorney, Agent, or Firm*—Milton E. Kleinman; George W. Killian

[57] ABSTRACT

A small motor assembly is shown which requires little, if any, hand work for assembly. A terminal assembly is associated with the magnetic frame and held in place by the field coils. The terminations of the field coils are connected to selected terminals of the terminal assembly. An end bracket which supports an end bearing for the armature and brush holders is secured to the terminal assembly to provide a complete motor assembly. The brush holder is secured to the end bracket by a plurality of protuberances which mate with slots in the end bracket. The brush holder has formed thereon a projection which makes connection with a predetermined terminal on the terminal assembly when the end bracket is secured to the terminal assembly. The brush holder may be secured to the end bracket in a plurality of positions thereby causing its projection to make a connection with different predetermined terminals on the terminal assembly. The particular selected position for securing the brush holder to the end bracket and the consequent change of terminal contacted by the projection from the brush holder can influence the direction of rotation of the armature. The brush and brush spring may be assembled in the brush holder after the end bracket is secured to the terminal assembly. The brush and spring may be captured in the brush holder by bending an end wall into position after the brush and spring are assembled in the brush holder. At an appropriate time, wires for connection to a power source may be inserted into appropriate terminals of the terminal assembly.

15 Claims, 5 Drawing Figures

MODULAR MOTOR

CROSS REFERENCE TO RELATED APPLICATIONS

The modular motor described may make use of the invention disclosed and described in the application of Michael J. Hillyer and Christian R. Carlson, Jr. which was filed on Nov. 27, 1974 and assigned Ser. No. 527,566, now U.S. Pat. No. 3,955,113 and that of Michael J. Hillyer and Victor J. Madison, filed on Apr. 21, 1975 and assigned Ser. No. 569,918, now U.S. Pat. No. 4,038,573, issued July 26, 1977. While the inventions disclosed and described in the aforementioned co-pending applications do not necessarily have to be used in the modular motor described herein, the present structure is described as using the disclosures of the cited applications.

BACKGROUND OF THE INVENTION

While the invention disclosed herein could be used on a wide variety of motors, it is contemplated that it would be used primarily on fractional horsepower motors such as are used in numerous household appliances including, but not limited to: vacuum cleaners, sewing machines, blenders, food mixers, humidifiers, dehumidifiers and a wide variety of other devices and appliances. There is fierce competition in the sale of motors of the class described and the manufacture and sale of a satisfactory motor at a profit depends upon the production of a motor which will meet the requirements and which is efficient and economical. In order to produce an economical motor, it is necessary to design a versatile motor using a minimum number of parts, each of which is in itself an economical part and which can be assembled in minimum time, at minimum cost with minimum rejections. Much time and effort has been invested to achieve these goals.

These efforts have produced better alloys, more efficient winding machines, improved and more economical insulating materials, the elimination and/or combination of parts, the elimination and/or reduction of manual steps during the assembly and other improvements which are familiar to those with experience in the related arts. The present invention provides a modular motor with a reduced number of parts and which minimizes hand labor for assembly.

SUMMARY OF THE INVENTION

A modular motor is disclosed which is particularly well adapted for manufacture and assembly by automatic processes and/or which requires a minimum number of components and hand work. A particular feature of the invention resides in the brush holder and its manner of support together with the means by which an electrical connection is made from the brush, through the brush holder, to other points without the requirement for the use of a jumper wire or extra terminals.

The motor assembly includes a terminal board which is mounted in a predetermined position with respect to the stator and/or field windings. An end bracket which provides support for one end of the armature also provides support for the brush holders and the end bracket is in turn supported by the terminal board with a fixed physical relationship therebetween. The brush holder includes a projection which may be formed therefrom and which extends from the brush holder to make contact with a predetermined terminal on the terminal board in response to the assembly of the end bracket to the terminal board. The projection on the brush holder eliminates the need for a jumper connection between the brush and a terminal connected to the field winding and/or power supply. With the elimination of the connecting jumper, the need to cut and strip such jumpers is also eliminated. The brush holder may be fabricated from sheet metal and includes simple means for capturing the brush and pressure spring by bending a portion of the brush holder to form a closing end. The brush holder may also include a projection member for preventing the pressure spring from making contact with the commutator should the brush become completely worn.

The end bracket provides means for selectively mounting the brush holder in first or second positions. When the brush holder is mounted in a first position, thereby causing its projection to mate with a first predetermined terminal on the terminal board, the armature will have clockwise rotation; while when the brush holder is mounted in the second selected position on the end bracket, its projection makes contact with a second selected terminal on the terminal board causing the armature to rotate in a counterclockwise direction.

It is an object of the invention to provide a new and improved motor assembly.

It is a more specific object of the invention to provide a motor assembly which is more economical because of the elimination of parts and its adaptability to automatic assembly.

It is another object of the invention to provide a means for making direct electrical contact from the brush holder to the field winding and/or external power supply.

It is another objection of the invention to provide selective means for mounting a brush holder to selectively provide for clockwise or counterclockwise armature rotation.

It is another object of the invention to provide a brush holder which provides for simple and economical assembly of the brush and pressure spring therein.

BRIEF DESCRIPTION OF THE DRAWING

A full understanding of the invention, together with other objects, features and advantages may be had from considering the drawing, in which like parts are given the same identifying number in all figures, together with the following detailed specification.

DESCRIPTION OF THE PREFERRED EMBODIMENT

Figure 1:
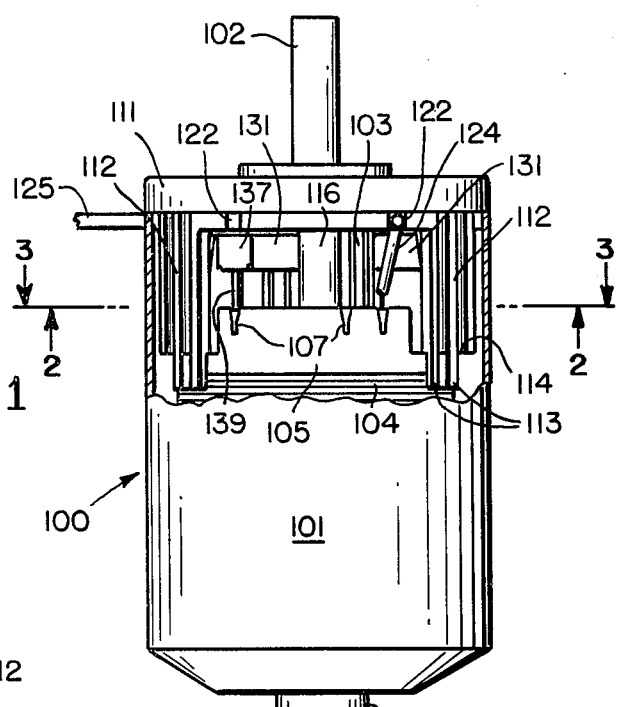
FIG. 1 is a side view of a modular motor with a portion of the case broken away to shown selected interior components.

Turning attention now to FIG. 1 of the drawing, there will be seen a modular motor generally designated 100 and which comprises a partially cut away view of the housing 101 to illustrate some of the internal components. The modular motor 100 has a conventional rotor or armature which is not seen in this view, although the output shaft 102 is clearly seen. In addition, a portion of the commutator 103 may be seen. A portion of the laminations 104 forming the magnetic circuit may be seen. Resting on top of the laminations 104 and coupled thereto, is a terminal board 105 which is more fully shown in FIG. 3 and whose construction and function is more fully shown and described in the cited co-pending application of Michael J. Hillyer and Victor J. Madison, filed on Apr. 21, 1975 and given Ser. No. 569,918, now U.S. Pat. No. 4,038,573 and which is incorporated herein by reference. As indicated in more detail in the last mentioned application, the terminal board 105 has captured therein a plurality of terminals such as the terminal indicated generally as 106 in FIG. 5. As indicated more fully in the reference application, each of the terminals 106 is adapted to make contact with a wire, such as the terminus of one of the field windings, by laying such terminus in a slot 107 and subsequently inserting the terminal 106 into the well 108. Subsequently, another conducting member 139 may be inserted into the well 108 and deflect the tang 109 which, because of its spring tension, presses the inserted member 139 against the wall 110 of the terminal 106. These elements are most clearly shown in FIG. 5. The field windings (not shown in this application) are wound in the spaces 146 as more clearly shown in the cited application.

The modular motor 100 also includes an end bracket 111 which has standoff legs 112 which support the end bracket 111 on the terminal board 105 with a fixed relationship relative thereto. As more clearly shown in FIG. 2, the end bracket 111 has four standoff legs 112. Each standoff leg 112 has two feet 113 which extend beyond the lower limit of the terminal board 105 and contact the laminations 104. The portion of the standoff leg assembly designated 112 in FIG. 2 occupy a common plane and make contact with the planar area 114 of the terminal board 105 (see FIG. 3). The contact between the surfaces 112 of FIG. 2 and the planar area 114 of FIG. 3 provide for the predetermined physical relationship between the terminal board 105 and the end bracket 111. The end bracket 111 is secured to the modular motor 100 by fastening means, such as screws (now shown), which extend through the holes 115 in the tubular portion 116 of the end bracket 111. The fastening means (not shown), which extend through the holes 115 also pass through a mating hole 117 in the terminal board 105 and at a remote end are secured by convenient means which do not form a part of this invention and which is not illustrated in detail.

Figure 2:
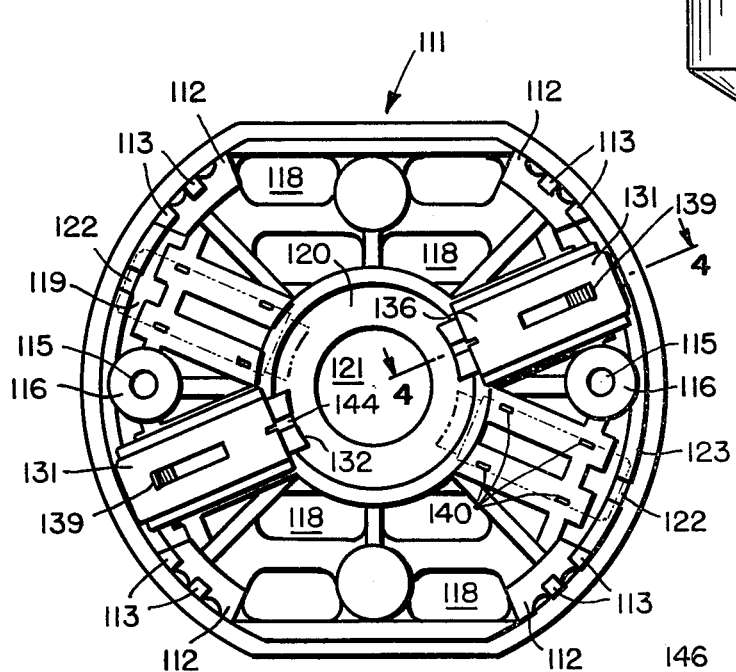
FIG. 2 is a view of end bracket and brush holders of the modular motor as seen when looking up from the plane 2—2 of FIG. 1.
Figure 3:
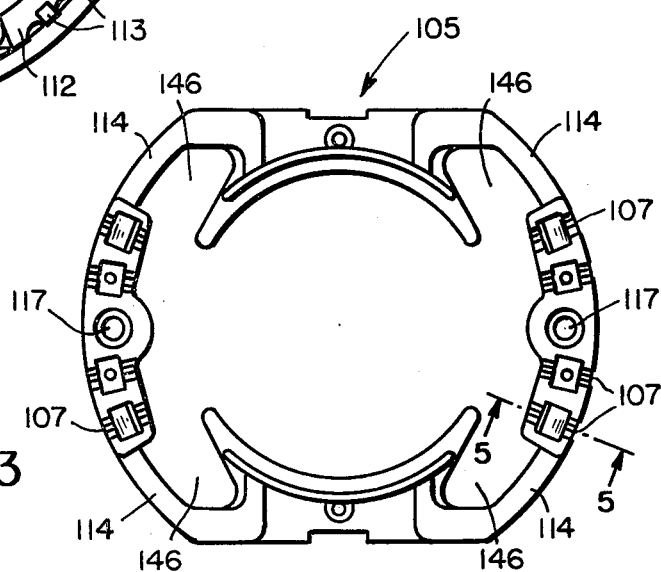
FIG. 3 is a view of the terminal board of the modular motor when looking down from the plane 3—3 of FIG. 1.
Figure 5:
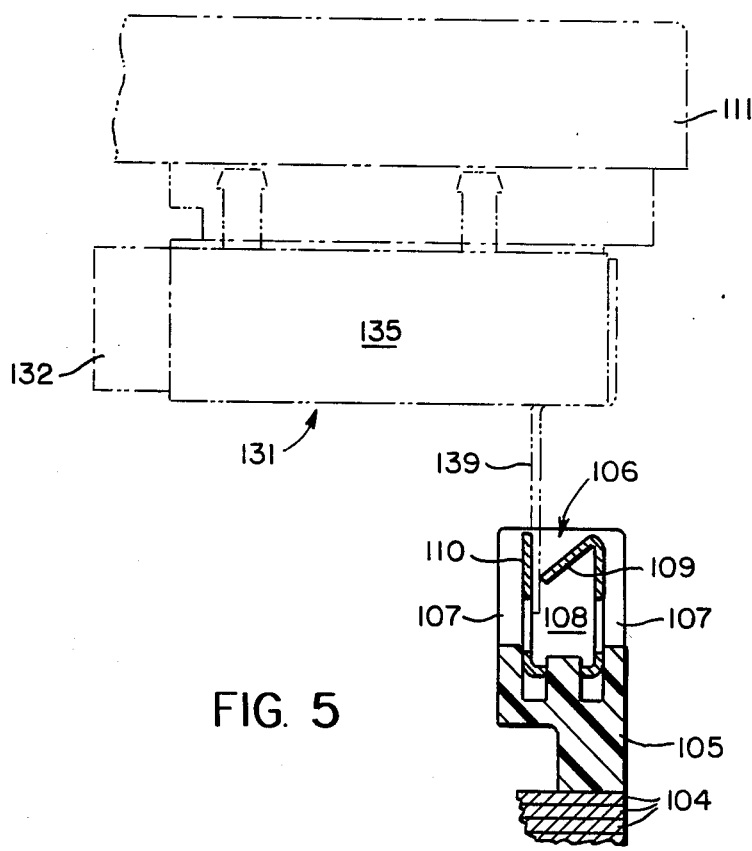
FIG. 5 is a cross section taken along the plane 5—5 of FIG. 3.

As may be seen in FIG. 2, the end bracket 111 has numerous holes such as 118 and 119 which make the end bracket lighter and which provide for improved ventilation. The end bracket 111 and the terminal board 105 may be conveniently fabricated of molded plastic. The end bracket 111 has a recessed area 120 for accommodating a bearing for the output shaft 102 which projects through the hole 121. Another bearing 145 for the other end (not shown) of the shaft 102 is included in the housing 101. Slots 122 may be seen in the rib 123 of the end bracket 111. As may best be seen in FIG. 1, the slot 122 provides a means for passing a wire 124 from the interior of the modular motor 100 to the exterior for permitting connection to a power supply. The interior end of the wire 125 is stripped and inserted into one of the terminals 106 in a manner similar to that described for the conducting member 139 and as shown in FIG. 5.

In FIG. 1, another wire 125 is shown extending from the interior of the modular motor 100 and from the far side of the end bracket 111.

A particular feature and advantage of the modular motor resides in the brush holder assembly which is secured to the end bracket 111. The brush holder, to be described more fully hereinbelow, has as an integral part thereof a projection 139 which fits into one of the terminals 106 to thereby provide an electrical connection from a segment of the commutator 103, through the brush 132 and brush holder 131, the projection 139 on the brush holder 131 to a terminal 106 and to an end of a field winding and/or to a wire which leads externally to the power supply. Considering now more specifically the various FIGS. 1, 2, 4 and 5, there will be seen a brush holder 131 which is supported by the end bracket 111. Contained within the brush holder 131 is a brush 132 and a pressure spring 133. The pressure spring 133 is a compression spring which urges the brush 132 to move longitudinally. When the modular motor 100 is fully assembled, the end 134 of brush 132 bears against the commutator 103. In the structure of the present modular motor 100, the brush holder 131 is fabricated by bending a stamped sheet metal part. In the illustrated structure, the brush holder 131 has four faces made from a single sheet metal stamping. More specifically, the brush holder 131 includes side wall 135 as seen in FIG. 5 and an identical side wall on the other side of the brush holder 131; a top wall 136 as most clearly seen in FIG. 2 and an end wall 137 as seen most clearly in FIG. 4. Extending from the side walls 135 are mounting feet 138 and extending from the top wall 136 is a projection 139. The projection 139 may be formed from the top wall 136 by a stamping operation which permits the bending out of the projection member 139 to the position shown. The mounting feet 138 extending from the side walls 135 are inserted into slots 140 molded into the end bracket 111. By providing serrations 141 on the mounting feet 138, the brush holder 131 may be secured to the end bracket 111 when the mounting feet 138 are inserted into the slots 140. If desired, a bottom wall 142 may be provided for the brush holder 131. The bottom wall 142 could be part of the sheet metal stamping for the brush holder 131; or it could be an independent member; or it could be part of the end bracket 111.

Considering now more particularly FIG. 2, it will be seen that two brush holders 131 are mounted on the end bracket 111 at diametrically opposed positions. If desired, the brush holders 131 could be mounted at a slightly different position. More specifically, the brush holder 131 shown at the right hand side of FIG. 2 could be mounted in a position rotated a few degrees clockwise from its illustrated position so that the mounting feet 138 of the brush holder 131 could mate with the slots designated 140 in FIG. 2. Normally, brush holders 131 are used in pairs and normally would be mounted 180° from each other. Those familiar with fractional horsepower motor assemblies will recognized that the two possible locations of the pairs of brush holders 131 will provide electrical circuit changes that will cause the armature to rotate in either a clockwise or counterclockwise direction depending upon the selected arrangement and mounting of the brush holders 131.

Figure 4:
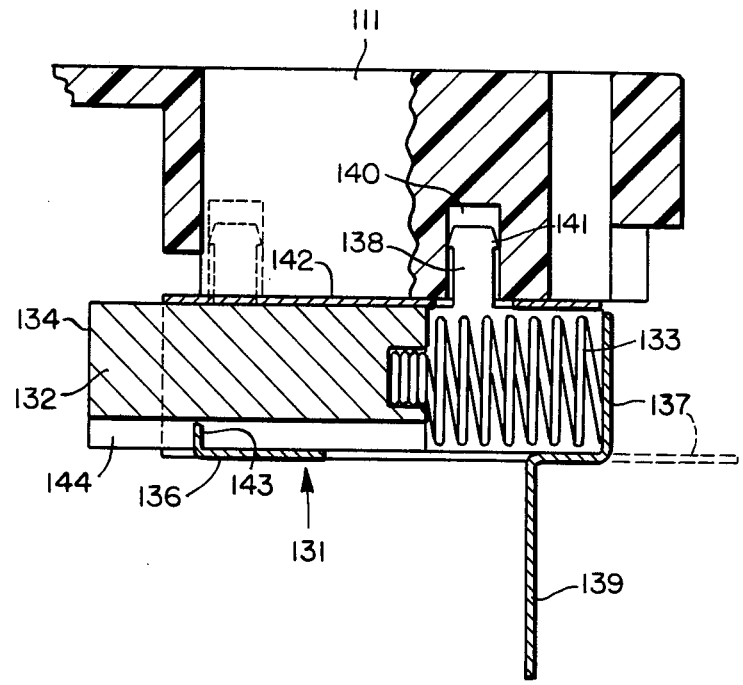
FIG. 4 is a cross section view along the plane 4—4 of FIG. 2 and includes a partial breakaway.

Normally, the modular motor 100 would be assembled with the end wall 137 of the brush holder 131 in the position shown by dotted lines in FIG. 4. Subsequently, the brush 132 and the pressure spring 133 would be assembled into the brush holder 132 and the end wall 137 folded up from its dotted line position to its solid line position as illustrated in FIG. 4.

The brush holder 131 includes a spring stop 143 which prevents the pressure spring 133 from projecting beyond the limits of the brush holder 131 in the event that the brush 132 becomes completely worn. The brush 132 includes a slot 144 which permits longitudinal motion of the brush 132 past the spring stop 143. Details of this structure and alternate structures for providing a similar feature are shown more clearly in the co-pending application Ser. No. 527,566, now U.S. Pat. No. 3,955,113.

As may best be seen in FIGS. 1 and 5, the projection 139 extends from the brush holder 131 and into the terminal 106 contained within the well 108 formed in the terminal board 105. By this means, an electrical connection is completed between the brush 132 and the terminal 106. As shown in the cited co-pending application Ser. No. 569,918, now U.S. Pat. No. 3,955,113 the terminus of one of the field windings may also be electrically coupled to the terminal 106, thereby providing a complete electrical connection from the field winding through the terminal 106, the projection 139, the brush housing 131, to the brush 132 without the use of jumper connections as was conventional in the prior art.

As will be recognized by those familiar with the design and assembly of small motors, the present structure lends itself to economical manufacture and assembly and uses a minimum number of parts which may be assembled without requiring hand labor.

While there has been shown and described what is considered at the present to be the preferred embodiment of the invention, modifications thereto will readily occur to those skilled in the related arts. For example, in another structure, alternate techniques might be used for providing the required predetermined relationship between the terminal board and the end bracket; the brush holder could be fabricated in a different manner and/or secured to the end bracket in a different manner. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A modular motor assembly comprising in combination:
   a. an armature assembly including a commutator;
   b. a structure for providing a magnetic field for said armature assembly;
   c. a modular terminal assembly for mounting in a fixed physical relationship with respect to said structure and having a plurality of terminals formed thereon with at least some having electrical connection to said structure;
   d. a bracket assembly for mounting in a predetermined physical relationship with respect to said terminal assembly;
   e. a brush holder supported on said bracket assembly for retaining a brush in alignment to make contact with said commutator; and
   f. said brush holder including an integral preformed projection for engagement with a predetermined one of said plurality of terminals to complete an electrical connection from said brush holder to said predetermined one of said plurality of terminals in response to said bracket assembly being mounted in its predetermined physical relationship with respect to said terminal assembly.

2. The combination as set forth in claim 1 and including a brush and pressure spring secured within said brush holder by an end wall of said brush holder.

3. The combination as set forth in claim 2, wherein said end wall comprises a bent tap portion of said brush holder.

4. The combination as set forth in claim 1, wherein said projection comprises a bent tab portion of said brush holder.

5. The combination as set forth in claim 1, wherein said brush holder is secured to said bracket assembly by mounting feet formed on said brush holder and inserted into mating slots in said bracket assembly.

6. The combination as set forth in claim 1, wherein said brush holder may be selectively supported in first or second positions on said bracket assembly for causing said integral preformed projection to complete an electrical contact with a first or second predetermined one of said plurality of terminals, respectively.

7. The combination as set forth in claim 6 and wherein at least some of said plurality of terminals are adapted to receive electrical connections from sources outside said motor assembly.

8. A modular motor assembly structure comprising in combination:
   a. a rotor assembly;
   b. a stator assembly;
   c. a plurality of terminals formed on a terminal assembly which is supported by said stator assembly in a fixed physical relationship with respect thereto;
   d. said stator assembly being electrically coupled to at least some of said plurality of terminals for providing electrical connection access to said stator assembly;
   e. a bracket assembly coupled to said terminal assembly by coupling means for providing a predetermined physical relationship between said terminal assembly and said bracket assembly;
   f. brush holding means supported by said bracket assembly for holding a brush to make electrical contact with said rotor assembly; and wherein
   g. said brush holding means includes an integral projection for making electrical contact with a predetermined one of said plurality of terminals in response to said bracket assembly and said terminal assembly being assembled with said predetermined physical relationhip.

9. The combination as set forth in claim 8, wherein said projection means comprises a tab formed from a surface of said brush holding means and bent to project at an appropriate angle with respect to said surface for making electrical contact with said predetermined terminal.

10. The combination as set forth in claim 8 and including a brush and pressure spring captured in said brush holding means by an end wall of said brush holding means which is remote from said rotor assembly.

11. The combination as set forth in claim 10, wherein said end wall comprises a member formed from a surface of said brush holding means.

12. The combination as set forth in claim 8, wherein said brush holding means includes restraining means for restraining said pressure spring so that it cannot project outward from said brush holding means towards said rotor assembly, but wherein said restraining means does not restrict longitudinal motion of said brush.

13. The combination as set forth in claim 12, wherein said restraining means comprises a second projection formed from a surface of said brush holding means.

14. The combination as set forth in claim 8, wherein said brush holding means is secured to said bracket assembly by a plurality of protuberances which project from said brush holding means and which mate with a set of slots in said bracket assembly.

15. The combination as set forth in claim 14 and including a plurality of said sets of slots in said bracket assembly to permit securing said brush holding means in first or second selected positions with respect to said bracket assembly for causing said integral projection on said brush holding means to make contact with a first or second selected one of said plurality of terminals.

* * * * *